US00RE36483E

United States Patent [19]

Chase

[11] E Patent Number: Re. 36,483

[45] Reissued Date of Patent: Jan. 11, 2000

[54] FOAM APPARATUS FOR USE WITH ROLL-OVER AND/OR AUTOMATIC TYPE CAR WASH

[76] Inventor: Steven Andrew Chase, 8004 NW. 20th, Oklahoma City, Okla. 73128

[21] Appl. No.: 09/195,358

[22] Filed: Nov. 17, 1998

Related U.S. Patent Documents

Reissue of:

[64] Patent No.: 5,575,852
Issued: Nov. 19, 1996
Appl. No.: 08/452,404
Filed: May 26, 1995

[51] Int. Cl.[7] ..... B60S 3/04

[52] U.S. Cl. ..... 118/680; 118/316; 118/323; 134/95.3; 134/102.1; 134/123; 239/173; 239/343; 239/561

[58] Field of Search ..... 134/45, 57 R, 134/95.3, 102.1, 123; 118/316, 323, 680; 239/8, 173, 343, 427, 450, 499, 561, 590

[56] References Cited

U.S. PATENT DOCUMENTS

| | | | |
|---|---|---|---|
| 2,465,562 | 3/1949 | Hopper et al. . | |
| 2,699,792 | 1/1955 | Fisher | 134/56 R |
| 2,764,893 | 10/1956 | Falkenberg . | |
| 2,965,305 | 12/1960 | Glazer et al. . | |
| 3,259,138 | 7/1966 | Heinicke | 134/45 |
| 3,261,369 | 7/1966 | Thiele | 134/123 |
| 3,288,109 | 11/1966 | Smith, Jr. et al. | 118/316 |
| 3,361,412 | 1/1968 | Cole | 239/427 X |
| 3,422,827 | 1/1969 | McColloch | 134/123 |
| 3,529,611 | 9/1970 | Daum et al. | 134/123 X |
| 3,587,807 | 6/1971 | Hickman | 134/123 X |
| 3,595,250 | 7/1971 | Hurst | 134/45 |
| 3,604,434 | 9/1971 | Hurst | 134/123 X |
| 3,612,077 | 10/1971 | Capro | 134/123 |
| 3,650,281 | 3/1972 | Hurst | 134/123 X |
| 3,763,822 | 10/1973 | Thompson | 134/45 X |
| 3,974,965 | 8/1976 | Miller | 239/427 X |
| 4,006,703 | 2/1977 | Smith | 118/312 X |
| 4,366,081 | 12/1982 | Hull | 239/343 X |
| 4,848,384 | 7/1989 | Christopher et al. | 134/57 R |
| 4,852,593 | 8/1989 | Daugherty | 134/123 X |
| 5,076,304 | 12/1991 | Mathews | 134/57 R |
| 5,161,557 | 11/1992 | Scheiter, Jr. | 134/57 R |
| 5,255,695 | 10/1993 | Downey | 134/123 |
| 5,364,031 | 11/1994 | Taniguchi et al. | 239/343 X |
| 5,518,577 | 5/1996 | Jinbo et al. | 239/561 X |

*Primary Examiner*—Philip R. Coe
*Attorney, Agent, or Firm*—R. William Graham

[57] ABSTRACT

The present invention is directed to a manifold which includes a foam generating zone having means for receiving a foamable solution and air therethrough to produce a foam, a streaming discharge zone wherein the streaming discharge zone includes a first plurality of aperture surfaces of a first diameter and a second plurality of aperture surfaces of a second diameter larger than said first diameter and a buffer zone operably communicably associated with the foam generating zone and streaming discharge zone with means for impeding flow of the foam therebetween.

20 Claims, 4 Drawing Sheets

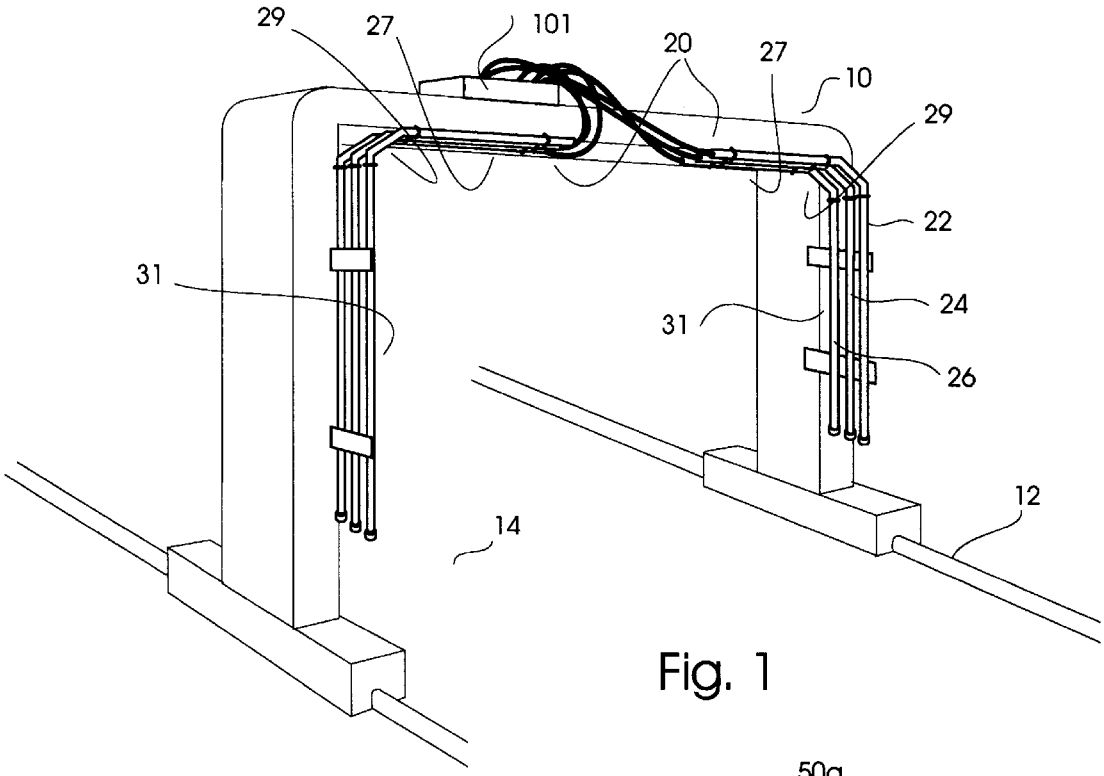
Fig. 1
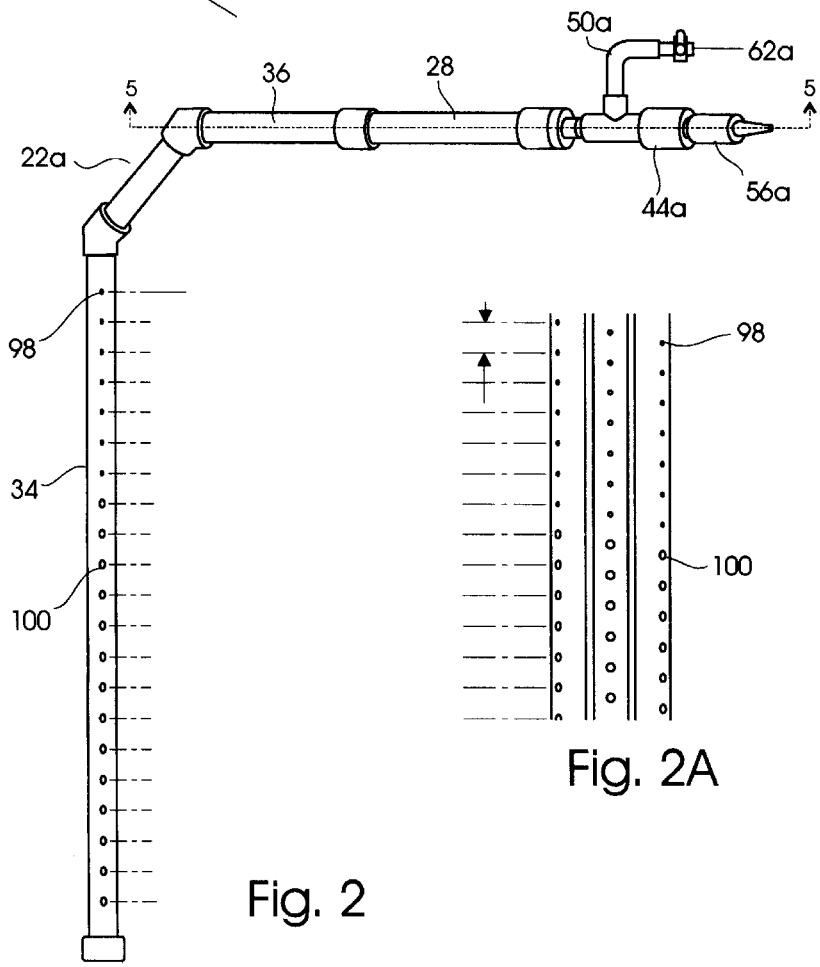
Fig. 2A
Fig. 2

FOAM APPARATUS FOR USE WITH ROLL-OVER AND/OR AUTOMATIC TYPE CAR WASH

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to automatic vehicle wash systems and more particularly, but not by way of limitation, to a multiple foam wax apparatus for use on a roll-over type wash system desired to effectively and aesthetically wax the vehicle.

2. Background of the Invention

There are many types of vehicle wash and wax systems adapted to clean protect a vehicle. For example, one type provides for a hand operated high pressure wand which sprays the vehicle. Such hand held type permits the user to optionally select one of a wash, rinse or wax mode.

Roll-over type car wash systems typically use jet sprays of water against the side of a vehicle through use of an array of nozzles displaced from but direct toward a top and sides of the vehicle. Such systems can move around the vehicle with the vehicle remaining in place while others move relative to the vehicle in a straight line along the length of the vehicle, and with the intent to spray the entire exterior surface of the vehicle.

Still other automatic vehicle wash systems offer means of a tunnel-type wash and wax system, wherein a vehicle moves through a number of linear spaced wash, rinse and wax stations and typically employ a plurality of fabric strips or other similar material which are brushed along the exterior of the vehicle in order to wash and remove dirt from the surface of the vehicle.

With such automatic wash systems, particularly the roll-over type, there has been much difficulty in providing an adequate delivery of the wax to the car. Such systems use a foam spray wax which is commonly of an anionic or cationic nature. Characteristic of anionic foam waxes is their high foaming action and while this is desirable with regard to providing high foam and an adequate wax coat on the vehicle, these type foam waxes are difficult to rinse off the vehicle. Alternatively, cationic foam waxes are characteristically low foaming and are easily rinsed off the vehicle, but provide less adequate wax coat. Additionally, brushless and/or roll-over type automatic car wash use spray heads which by design are limited in their approach distance to the car exterior and have limited effectiveness.

Since there lacks an adequate apparatus to apply a foaming wax in a manner which adequately covers the vehicle, readily permits washing off thereof, and is visually inspectable as well as aesthetically pleasing, a need remains in the art to provide an improved car wash and wax apparatus.

SUMMARY OF THE INVENTION

It is a general object is to improve car wash systems.

It is another object of to improve apparatus for spraying foam wax onto a car in a car wash system, particularly of the roll-over type.

Another object of the present invention is to further add special visual effects to a car washing system.

Accordingly, the present invention is directed to a manifold particularly well suited for use in a roll-over type car wash. In an embodiment, the manifold includes a foam generating zone having means for receiving a foamable solution and air therethrough to produce a foam, a streaming discharge zone wherein the streaming discharge zone includes a first plurality of aperture surfaces of a first diameter and a second plurality of aperture surfaces of a second diameter larger than said first diameter and a buffer zone communicably operably associated with the foam generating zone and streaming discharge zone with means for impeding flow of the foam therebetween. In another embodiment, the foam generating zone and buffer zone are integrally formed.

In the preferred form of the invention, the foam generating zone includes a first tubular member and a second tubular member, each tubular member having a spongy material disposed therein, the buffer zone includes a first tubular member communicably connected to the first tubular member of the foam generating zone and a second tubular member communicably connected to the second tubular member of the foam generating zone, each the tubular member of the buffer zone having a bend therein sufficient to impede flow of the foam to the streaming discharge zone; and the streaming discharge zone including a first tubular member communicably connected to the first tubular member of the buffer zone and a second tubular member communicably connected to the second tubular member of the buffer zone, each of the tubular member of the streaming discharge zone having the aperture surfaces longitudinally defined therein. Also included in the foam generating zone is a third tubular member having a spongy material disposed therein, in the buffer zone is a third tubular member communicably connected to the third tubular member of the foam generating zone, the third tubular member of the buffer zone having a bend therein sufficient to impede flow of the foam to the streaming discharge zone, and in the streaming discharge zone is a third tubular member communicably connected to the third of the buffer zone, the third tubular member of the streaming discharge zone having the aperture surfaces longitudinally defined therein.

In such form, aperture surfaces of the tubular members of the discharge zone are staggered from one another. In this regard, a series of distinct and adjacent streams may be created when solution is forced through the aperture surfaces of the discharge zone to maximize the solution coverage over the vehicle. Optionally and preferably, a different colorant is added to the foam supply to each of the tubular members of the discharge zone to permit an aesthetically pleasing visual effect to the viewer, i.e. a rainbow effect onto the vehicle, as well as an easier visual inspection of the solution coverage and adherence to the vehicle.

Other aspects, features and details of the present invention can be more completely understood by reference to the following detailed description of a preferred embodiments, taken in conjunction with the drawings, and from the appended claims.

BRIEF DESCRIPTION OF THE DRAWINGS

FIG. 1 is a perspective view of the manifold of the present invention connected to a roll-over type car wash.

FIG. 2 is a perspective view of an L-shaped tubular member of the manifold used in the present invention.

FIG. 2a is a side view of a portion of three adjacent L-shaped tubular members of the manifold having staggered aperture surfaces.

DESCRIPTION OF THE PREFERRED EMBODIMENTS

Figure 3:
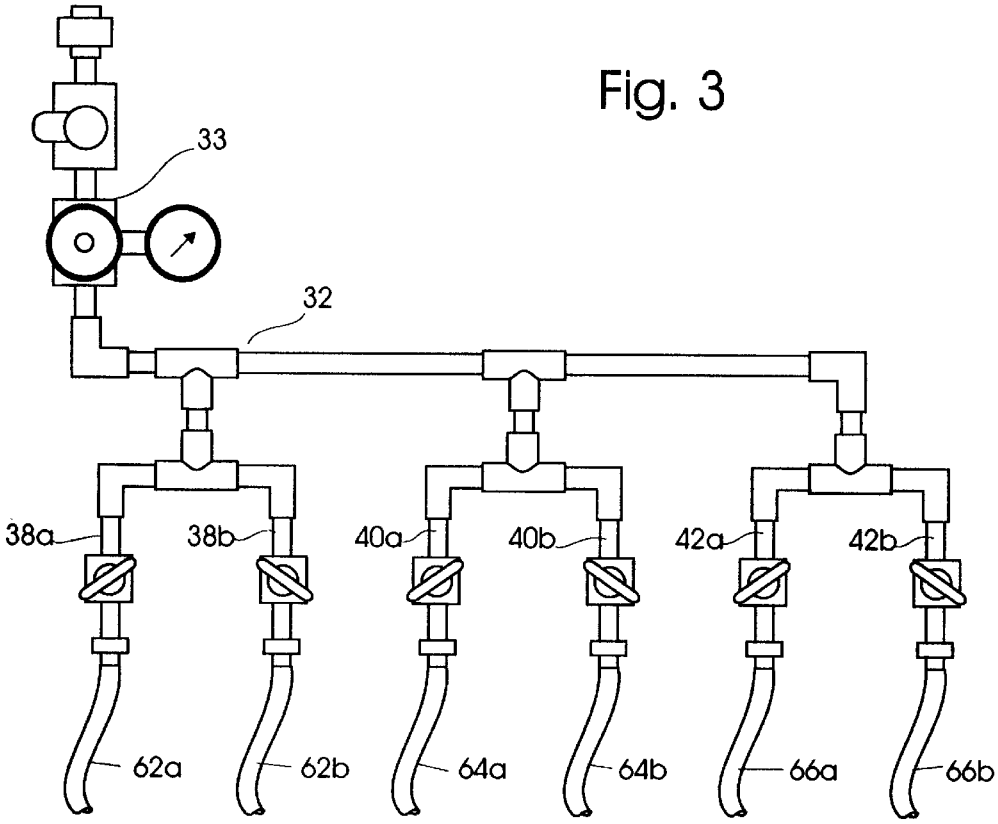
FIG. 3 is a side view of the air delivery apparatus of the manifold of the present invention.

Referring to the drawings, a roll-over type car wash is generally designated by the numeral 10, having the manifold apparatus 20 of the present invention connected thereto. As can be seen, the manifold 20 is readily adaptable to the roll-over type car wash 10 which would include framework known in the art, as disclosed in U.S. Pat. No. 5,076,304, for example, such as a generally inverted U-shaped frame member having liquid dispensing means disposed on said U-shaped frame member and means pivotally mounting the liquid dispensing means for movement about the vehicle to permit dispensing liquid toward an exterior surface of the vehicle, motive means for reciprocally moving the U-shaped frame member along a path adjacent the vehicle along a pair of a parallel rails 12 mounted on the floor 14 of a vehicle wash location, and would include detection means for sensing the front end of the vehicle for measuring length of the vehicle, and sensing the rear end of the vehicle such that the motive means can dependably reciprocally move the apparatus in length paths ending adjacent to the front end and rear end of the vehicle, all of which is incorporated herein by reference.

The manifold 20 of the invention includes a plurality of similarly formed inverted L-shaped tubular members 22a and 22b, 24a and 24b, and 26a and 26b which collectively make up a foam generating zone 27, buffer zone 29 and streaming discharge zone 31. As seen in FIG. 2, tubular member 22a, for example, includes a tubular member 28 as part of the foam generating zone 27 operatively connected to a water/chemical supply apparatus 30, shown in FIGS. 4 and 7, and an air supply apparatus 32, shown in FIGS. 3 and 7, to receive a foamable solution and air therethrough resulting in a foam. Also provided are a tubular member 34 of the streaming discharge zone 31 and a tubular member 36 and 108 of the buffer zone 29 which communicably connects the tubular member 28 and tubular member 34 yet impedes flow of the resulting foam therebetween. Each of the other L-shaped members 22b, 24a, 24b, 26a and 26b are similarly formed.

Figure 4:
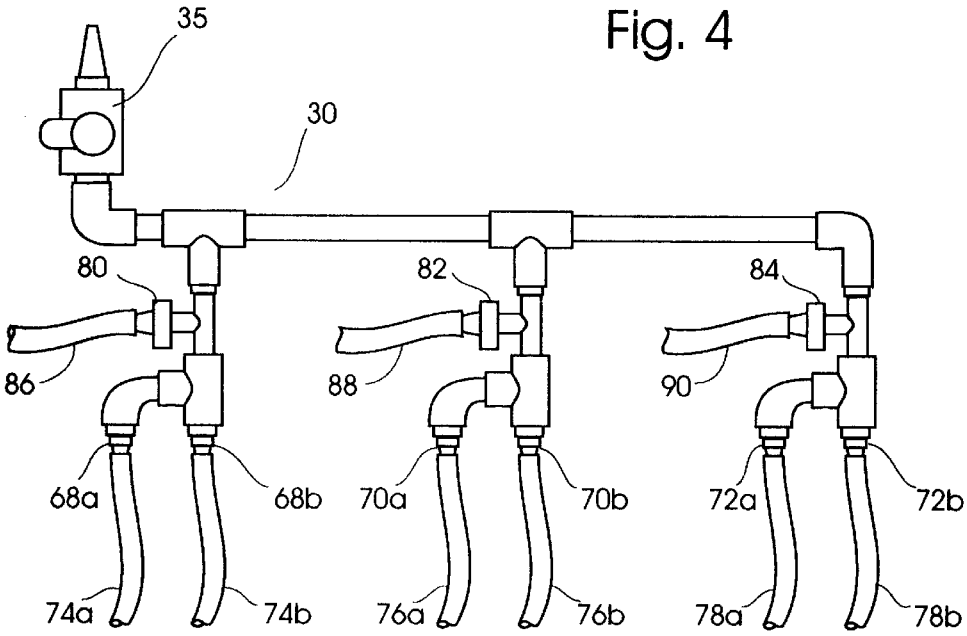
FIG. 4 is a side view of the water/chemical delivery apparatus of the manifold of the present invention.

As seen in FIG. 3, the air supply apparatus 32 has a pressurized air source 33. The air supply apparatus 32 is equipped with three pairs (or six individual) valve outlets 38a and 38b, 40a and 40b, and 42a and 42b.

A conduit 44a, shown in FIG, 2, communicably connects to an end of the tubular member 28 and has an air intake 50a and a fluid intake 56a. Similarly formed are conduits 44b, 46a and 46b, 48a and 48b with their respective air intakes 50b, 52a, 52b, 54a and 54b and fluid intakes 56b, 58a, 58b, 60a and 60b(shown generally without numerals in FIG. 7).

Figure 7:
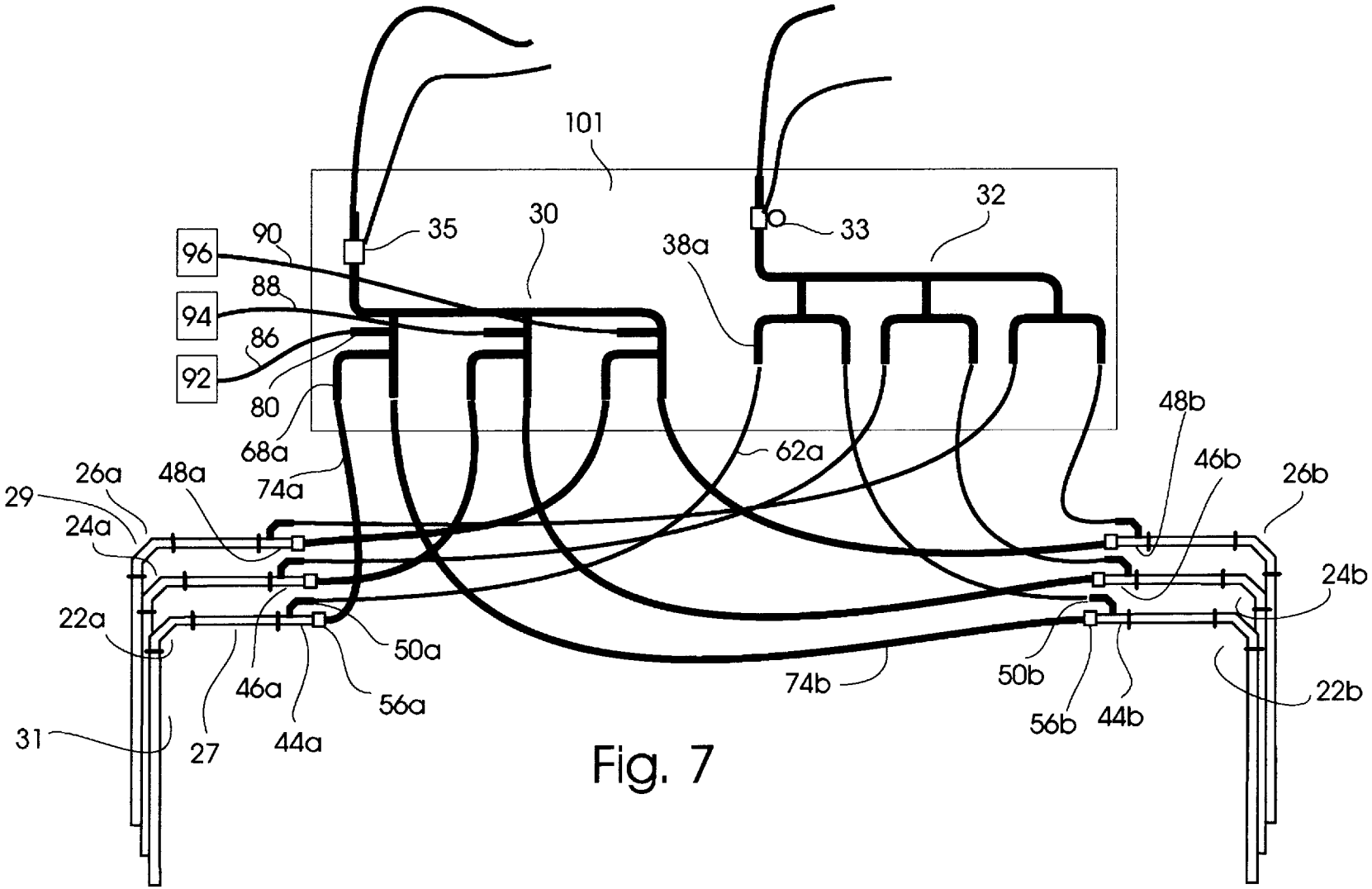
FIG. 7 is a schematic showing connections of the air apparatus and water/chemical apparatus of the manifold of the present invention.

A fluid transport line 62a interconnects outlet 38a with intake 50a. A fluid transport line 62b interconnects outlet 38b with intake 50b, and fluid transport lines 64a, 64b, 66a and 66b likewise interconnect their respective outlet and intakes as schematically shown in FIG. 7, for example.

The water/chemical supply apparatus 30 has a pressurized water supply source 35. It is equipped with three pairs (or six individual) valve outlets 68a and 68b, 70a and 70b, and 72a and 72b.

A fluid transport line 74a interconnects outlet 68a with intake 56a. A fluid transport line 74b interconnects outlet 68b with intake 56b, and fluid transport lines 76a, 76b, 78a and 78b likewise interconnect their respective outlet and intakes as schematically shown in FIG. 7.

The apparatus 30 includes inlets 80, 82 and 84 connected in-line to outlets 68, 70, and 72, respectively. Fluid transport lines 86, 88 and 90 connect inlets 80, 82 and 84, respectively, to foamable wax solutions 92, 94 and 96, respectively. It is preferred that each of the solutions 92, 94 and 96 each have a different color additive to enable three different color foams to be created and discharged by the manifold 20.

More particularly referring to the L-shaped members 22, 24 and 26, each has a diameter of approximately one inch and positioned adjacent one another, but it is noted that slightly smaller or larger diameter pipes are suitable. The streaming discharge zone 31 includes a first plurality of aperture surfaces 98 of a first diameter and a second plurality of aperture surfaces 100 of a second diameter larger than the first diameter. The aperture surfaces 98 and 100 are generally axially aligned with one another throughout the length of the zone 34, however, it is conceived that the aperture surfaces could be slightly offset to achieve a desired streaming effect. Generally when connected to the car wash apparatus 10, the L-shaped members 22, 24 and 26 will have their aperture surfaces directed inwardly toward a location where the vehicle would be located.

With respect to tubular member 22, the aperture surfaces 98 are positioned nearer the buffer zone with the first of the aperture surfaces 98 being approximately three inches (3") from the buffer zone 29. The aperture surfaces 98 are spaced from one another approximately three inches (3") apart having a diameter of approximately three sixty fourth of an inch (3/64"). The aperture surfaces 100 are likewise spaced from one another three inches (3") apart but have a larger diameter substantially that equal to one sixteenth of an inch (1/16"), a first of which being spaced about three inches (3") from a last of the aperture surfaces 98.

With respect to tubular members 24 and 26, the aperture surfaces 98 and 100 are generally the same as characterized for tubular member 22, with the exception for tubular member 24 that a first of the aperture surfaces 98 is spaced approximately four inches (4") from the buffer zone 29 and for tubular member 26 that a first of aperture surfaces 98 is spaced approximately five inches (5") from the buffer zone 29. This creates an offset streaming discharge pattern of approximately one inch (1") apart which is found to be very desirable in applying a substantial coverage of foam wax to the car and also permits for a special effect to be created. This staggered or offset relation can best be seen in FIG. 2a. When using differing colored foam in each of the three members 22, 24 and 26, a rainbow effect is displayed upon discharging the foams through the streaming discharge zone 31 in the air and onto the vehicle as the car wash 10 is moved along the vehicle.

In this regard, movement of the car wash 10 is controlled by a computer mounted in a control box 101 operatively connected to the car wash 10 in a manner known to the art and a detailed description thereof is not deemed necessary, but suffices to say that the computer can control the various initiation timing operations and cycle of washing, rinsing and waxing the vehicle as is known in the art.

Figure 5:
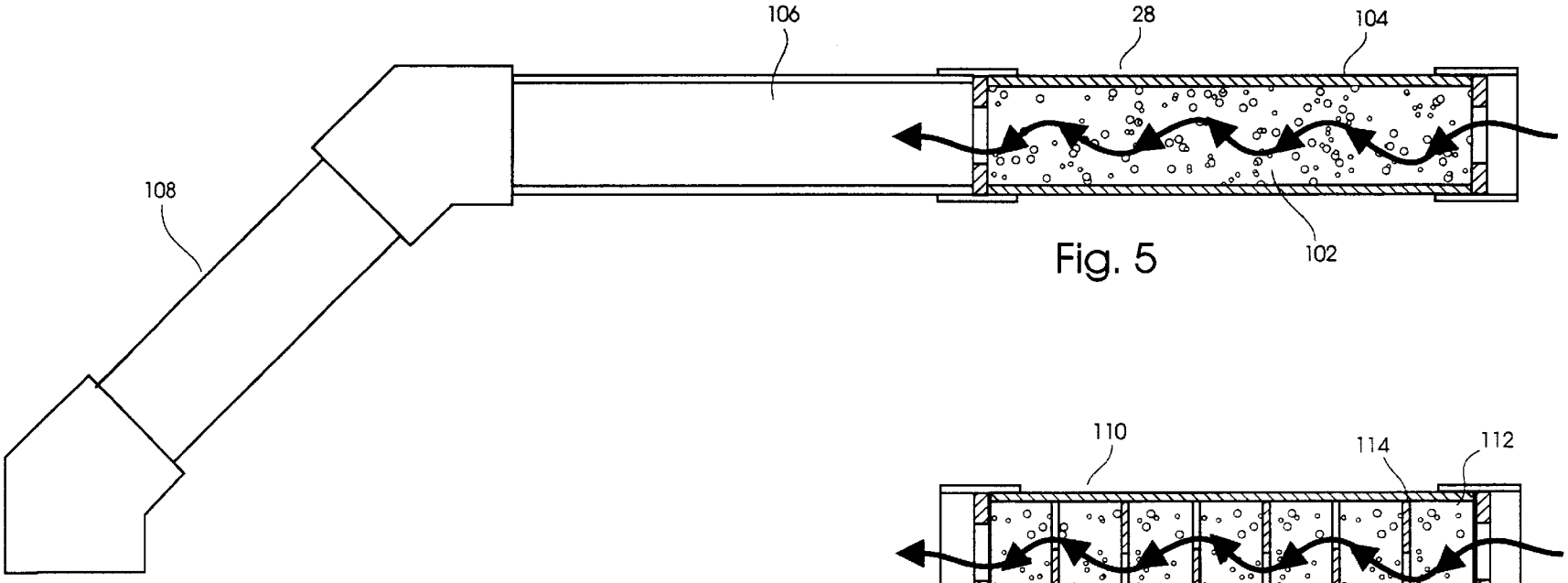
FIG. 5 is a section taken along line 5—5 of FIG. 2 showing a foam generating zone and buffer zone.

The diameter sizes and spacing of the aperture surfaces 98 and 100 are preferred for low cationic foamable waxing solutions as are presently available on the market but it is contemplated that the size and spacing of the surfaces 98 and 100 may vary with the particular type of foamable wax solution employed. As mentioned, low cationic wax solutions are easier to rinse off and thus desirable for that reason, but have been found difficult to foam spray using a conventional type foam generating zone 27, as shown in FIG. 5. Such foam generating zone 27 has a porous or spongy material 102 disposed in a pipe 104 through which the air and foamable solution move.

The buffer zone 29, as shown in FIG. 5, includes a section of hollow pipe 106 and a section of bent pipe 108, the bend preferably at between 45 and 90 degrees, which impedes flow of foam to the aperture surfaces 98 and 100. This impedance with the aperture surfaces 98 and 100 and buffer zone 29 configuration provides a more even dispersement and coverage of the vehicle.

Figure 6:
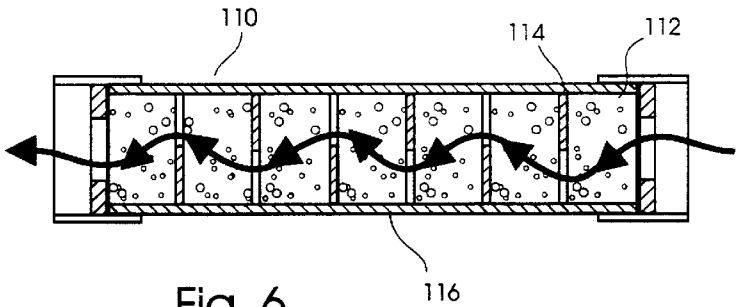
FIG. 6 is a section of an alternative embodiment having a foam generating zone and a buffer zone integrally formed.

Alternatively, as shown in FIG. 6, it is contemplated that a buffer zone could be provided as part of a foam generator 110. In this regard, the foam generator 110 includes a plurality of porous or spongy material pieces 112 separated by baffles 114, all of which are enclosed in a pipe 116. In this system, the foam generator 110 can be coupled more directly to the streaming discharge zone 31 without providing a bend.

The present invention has been described with a certain degree of particularly but is not intended to be limiting with respect to the claims hereto. In this regard, it is understood that the present disclosure has been made by way of example and changes in detail or structure may be made without departing from the spirit of the invention and the full scope of protection should be accorded the appended claims hereto.

What is claimed is:

1. An automatic wash and wax system for a vehicle of the type having a generally inverted U-shaped frame member, liquid dispensing means disposed on said U-shaped frame member and means pivotally mounting said liquid dispensing means for movement about the vehicle to permit dispensing liquid toward an exterior surface of the vehicle, motive means for reciprocally moving said U-shaped frame member along a path adjacent the vehicle, and detection means for sensing the front end of the vehicle for measuring length of the vehicle, and sensing the rear end of the vehicle such that said motive means can dependably reciprocally move the apparatus in length paths ending adjacent to the front end and rear end of the vehicle further including:

a manifold disposed on said U-frame member having a foam generating zone with means for receiving a foamable solution and air therethrough to generate a foam, a streaming discharge zone communicably connected to said foam generating zone wherein the streaming discharge zone includes a first plurality of aperture surfaces of a first diameter and a second plurality of aperture surfaces of a second diameter larger than said first diameter, wherein the foam is discharged through said aperture surfaces in a stream onto the vehicle, and a buffer zone operatively associated with said foam discharge zone for impeding flow of the foam to said streaming discharge zone.

2. The car wash of claim 1, wherein said foam generating zone includes a first tubular member and a second tubular member, each tubular member having a spongy material disposed therein;

wherein said buffer zone includes a first tubular member communicably connected to said first tubular member of said foam generating zone and a second tubular member communicably connected to said second tubular member of said foam generating zone, each said tubular member of said buffer zone having a bend therein sufficient to impede flow of the foam to said streaming discharge zone; and wherein said streaming discharge zone includes a first tubular member communicably connected to said first tubular member of said buffer zone and a second tubular member communicably connected to said second tubular member of said buffer zone, each said tubular member of said streaming discharge zone having said aperture surfaces longitudinally defined therein.

3. The manifold of claim 2, wherein said tubular members of said discharge zone are adjacent one another and said aperture surfaces of said first tubular member of said streaming discharge zone are staggered from said aperture surfaces of said second tubular member of said streaming discharge zone.

4. The manifold of claim 3, wherein said foam generating zone includes a third tubular member having a spongy material disposed therein;

wherein said buffer zone includes a third tubular member communicably connected to said third tubular member of said foam generating zone, said third tubular member of said buffer zone having a bend therein sufficient to impede flow of the foam to said streaming discharge zone; and wherein said streaming discharge zone including a third tubular member communicably connected to said third of said buffer zone, said third tubular member of said streaming discharge zone having said aperture surfaces longitudinally defined therein.

5. The manifold of claim 4, wherein said tubular members of said discharge zone are adjacent one another and said aperture surfaces of said first tubular member of said streaming discharge zone are staggered from said aperture surfaces of said second tubular member and said aperture surfaces of said third tubular member of said streaming discharge zone, and wherein said aperture surfaces of said second tubular member of said streaming discharge zone are staggered from said aperture surfaces of said third tubular member of said streaming discharge zone.

6. The manifold of claim 1, wherein a first of said first aperture surfaces are positioned nearer the buffer zone than said second plurality of aperture surfaces.

7. The manifold of claim 1, wherein said foam generating zone includes a tubular member having a spongy material disposed therein, said buffer zone includes a plurality of baffle members disposed within said tubular member about said spongy material sufficient to impede flow of the foam to said streaming discharge zone, and said streaming discharge zone including a tubular member having said aperture surfaces longitudinally defined therein.

8. The manifold of claim 1, wherein said foam generating zone includes a first tubular member and a second tubular member, each tubular member having a spongy material disposed therein;

wherein said buffer zone includes a first plurality of baffle members disposed within said first tubular member of said foam generating zone about said spongy material sufficient to impede flow of the foam to said streaming discharge zone and a second plurality of baffle members disposed within said second tubular member of said foam generating zone about said spongy material sufficient to impede flow of the foam to said streaming discharge zone; and wherein said streaming discharge zone includes a first tubular member communicably connected to said first tubular member of said foam generating zone and a second tubular member communicably connected to said second tubular member of said foam generating zone, each said tubular member of said streaming discharge zone having said aperture surfaces longitudinally defined therein.

9. The manifold of claim 8, wherein said tubular members of said discharge zone are adjacent one another and said aperture surfaces of said first tubular member of said streaming discharge zone are staggered from said aperture surfaces of said second tubular member of said streaming discharge zone.

10. The manifold of claim 9, wherein said first plurality of aperture surfaces are positioned nearer said buffer zone than said second plurality of aperture surfaces.

11. The manifold of claim 10, wherein said tubular members of said discharge zone are adjacent one another and said aperture surfaces of said first tubular member of said streaming discharge zone are staggered from said aperture surfaces of said second tubular member and said aperture surfaces of said third tubular member of said streaming discharge zone, and wherein said aperture surfaces of said second tubular member of said streaming discharge zone are staggered from said aperture surfaces of said third tubular member of said streaming discharge zone.

12. The manifold of claim 8, wherein said foam generating zone includes a third tubular member having a spongy material disposed therein;

wherein said buffer zone includes a third plurality of baffle members disposed within said third tubular member of said foam generating zone about said spongy material sufficient to impede flow of the foam to said streaming discharge zone; and wherein said streaming discharge zone includes a third tubular member communicably connected to said third tubular member of said foam generating zone, said third tubular member of said streaming discharge zone having said aperture surfaces longitudinally defined therein.

13. The manifold of claim 1, wherein said first plurality of said aperture surfaces each has a diameter of approximately three sixty fourths of an inch.

14. The manifold of claim 1, wherein said second plurality of said aperture surfaces each has a diameter of approximately one sixteenth of an inch.

*15. An automatic wash and wax system for a vehicle of the type having a generally inverted U-shaped frame member, liquid dispensing means disposed on said U-shaped frame member and means pivotally mounting said liquid dispensing means for movement about the vehicle to permit dispensing liquid toward an exterior surface of the vehicle, motive means for reciprocally moving said U-shaped frame member along a path adjacent the vehicle, and detection means for sensing the front end of the vehicle for measuring length of the vehicle, and sensing the rear end of the vehicle such that said motive means can dependably reciprocally move the apparatus in length paths ending adjacent to the front end and rear end of the vehicle and further for delivering multiple foamable wash/wax solutions and designed to effectively and aesthetically wash/wax the vehicle, which improvements include:*

*a manifold operably associated with said U-frame member connected to a foam generating zone having a first tubular member with means for receiving a foamable wash/wax solution and air therethrough to generate a foam and a second tubular member with means for receiving a foamable wash/wax solution and air therethrough to generate a foam, a streaming discharge zone having a first tubular member communicably connected to said first tubular member of said foam generating zone and includes a plurality of aperture surfaces of a predetermined diameter and a second tubular member communicably connected to said second tubular member of said foam generating zone and includes a plurality of aperture surfaces of a predetermined diameter;*

*a first foamable wash/wax solution communicating with said first tubular members;*

*a second foamable wash/wax solution communicating with said second tubular members and of a different composition than said first foamable wash/wax solution wherein said first foamable wash/wax solution and said second foamable wash/wax solution differ in a color component; and wherein said foamable wash/wax solutions are discharged through said aperture surfaces in a stream onto the vehicle.*

*16. The car wash of claim 15, which further includes a buffer zone operatively associated with said foam discharge zone for impeding flow of the foam to said streaming discharge zone.*

*17. The car wash of claim 15, wherein said first tubular member and said second tubular member of said foam generating zone each have a spongy material disposed therein.*

*18. The car wash of claim 15, wherein said tubular members of said streaming discharge zone are adjacent one another and said aperture surfaces of said tubular members of said streaming discharge zone are staggered.*

*19. The car wash of claim 15, wherein said foam generating zone includes a third tubular member; and said streaming discharge zone includes a third tubular member communicably connected to said third of said foam generating zone and having aperture surfaces of a predetermined diameter; and further includes a third foamable wash/wax solution communicating with said third tubular members and of a different composition than said first foamable wash/wax solution and said second foamable wash/wax solution wherein said first foamable wash/wax solution and said second foamable wash/wax solution differ in a color component from said third foamable wash/wax solution.*

*20. The car wash of claim 19, which further includes a buffer zone operatively associated with said foam discharge zone for impeding flow of the foam to said streaming discharge zone.*

* * * * *